(12) United States Patent
Nadamoto et al.

(10) Patent No.: US 7,454,917 B2
(45) Date of Patent: Nov. 25, 2008

(54) AIR CONDITIONER FOR VEHICLE

(75) Inventors: Hiroyasu Nadamoto, Gunma (JP); Kazuo Masuko, Tochigi (JP); Ryuichi Hirose, Tochigi (JP); Tadashi Suzuki, Tochigi (JP); Hiroyuki Makishima, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 433 days.

(21) Appl. No.: 10/552,142

(22) PCT Filed: Apr. 9, 2004

(86) PCT No.: PCT/JP2004/005112

§ 371 (c)(1),
(2), (4) Date: Oct. 7, 2005

(87) PCT Pub. No.: WO2004/089668

PCT Pub. Date: Oct. 21, 2004

(65) Prior Publication Data

US 2006/0185375 A1    Aug. 24, 2006

(30) Foreign Application Priority Data

Apr. 10, 2003    (JP)    ............................. 2003-106293

(51) Int. Cl.
*B60H 1/32*    (2006.01)
*F25B 1/00*    (2006.01)
*F25B 49/00*    (2006.01)

(52) U.S. Cl. ........................................ 62/133; 62/228.1

(58) Field of Classification Search .................. 62/133, 62/228.1, 228.4, 228.5
See application file for complete search history.

(56) References Cited

U.S. PATENT DOCUMENTS

| 4,698,977 | A | | 10/1987 | Takahashi |
| 5,022,232 | A | * | 6/1991 | Sakamoto et al. ............. 62/133 |
| 7,096,680 | B2 | * | 8/2006 | Sugesawa et al. ............. 62/133 |
| 7,100,383 | B2 | * | 9/2006 | Sugesawa et al. ............. 62/133 |

FOREIGN PATENT DOCUMENTS

| EP | 0 396 017 A2 | 11/1990 |
| JP | 57-87712 A | 6/1982 |
| JP | 3-47219 U | 5/1991 |
| JP | 2002-192937 A | 7/2002 |

* cited by examiner

*Primary Examiner*—Marc E Norman
(74) *Attorney, Agent, or Firm*—Foley & Lardner LLP

(57) ABSTRACT

An air conditioner for a vehicle has a variable capacity compressor for compressing a refrigerant and controlling a discharged volume of the refrigerant by a power source for driving a vehicle, and a controller for setting a second target temperature higher by a predetermined temperature than a preset first target temperate and controlling the discharged volume of the refrigerant based on the second target temperature when entering into a state where fuel consumption of the power source for driving the vehicle is lowered.

3 Claims, 7 Drawing Sheets

AIR CONDITIONER FOR VEHICLE

TECHNICAL FIELD

The present invention relates to an air conditioner for a vehicle, and more specifically, to an air conditioner for a vehicle achieving that comfortableness and fuel consumption improvement are compatible with each other.

BACKGROUND ART

As well known, an air conditioner for a vehicle compresses a gas refrigerant by a compressor driven by a power source, such as an engine, for driving a vehicle, condenses the gas refrigerant, which has been heated to a high temperature and compressed with a high pressure, by a condenser, and turns the gas refrigerant into a low-temperature and low-pressure liquid refrigerant by performing decompression therefor by expansion means, and thereafter, evaporates the liquid refrigerant by an evaporator, thereby cooling an air-conditioning wind blown out into a vehicle cabin. The refrigerant evaporated by the evaporator returns to the compressor, and then, the above-described cycle is repeated.

In recent years, in response to a request for fuel consumption improvement, a variable capacity compressor provided with an electronic operation control valve (hereinafter, referred to as an ECV) controlled by an electric signal given from the outside has come to be used. In an air conditioner provided with this type of compressor, a target temperature of air to be blown out from the evaporator is calculated based on a set temperature set by a passenger, an actual temperature of the blown-out air is detected by a sensor, a duty ratio of the ECV is calculated based on the target temperature and the actual temperature, and based on the duty ratio, a discharged volume of the refrigerant from the compressor is controlled. Hence, the discharged volume of the refrigerant from the compressor can be controlled precisely, and accordingly, the fuel consumption improvement can be achieved.

Moreover, recently, in response to that the request for the fuel consumption improvement has been further being increased, a control method has also been sometimes adopted, in which an air conditioner computer for controlling the air conditioner and an engine computer make communication with each other, a duty signal capable of reducing power of the compressor while ensuring comfortableness is calculated in response to a running state, an engine load, and the like, and the duty signal is given to the ECV in an interruptive manner.

However, in the above-described conventional technology, there has been a case where it is difficult to calculate an appropriate duty signal, and where the comfortableness and the fuel consumption improvement cannot be made sufficiently compatible with each other.

DISCLOSURE OF INVENTION

A feature of the present invention is summarized to include: a variable capacity compressor for compressing a refrigerant and controlling a discharged volume of the refrigerant by a power source for driving a vehicle; and a controller for setting a second target temperature higher by a predetermined temperature than a preset first target temperature and controlling the discharged volume of the refrigerant based on the second target temperature when entering into a state where fuel consumption of the power source for driving the vehicle is lowered.

BEST MODE FOR CARRYING OUT THE INVENTION

Figure 1:
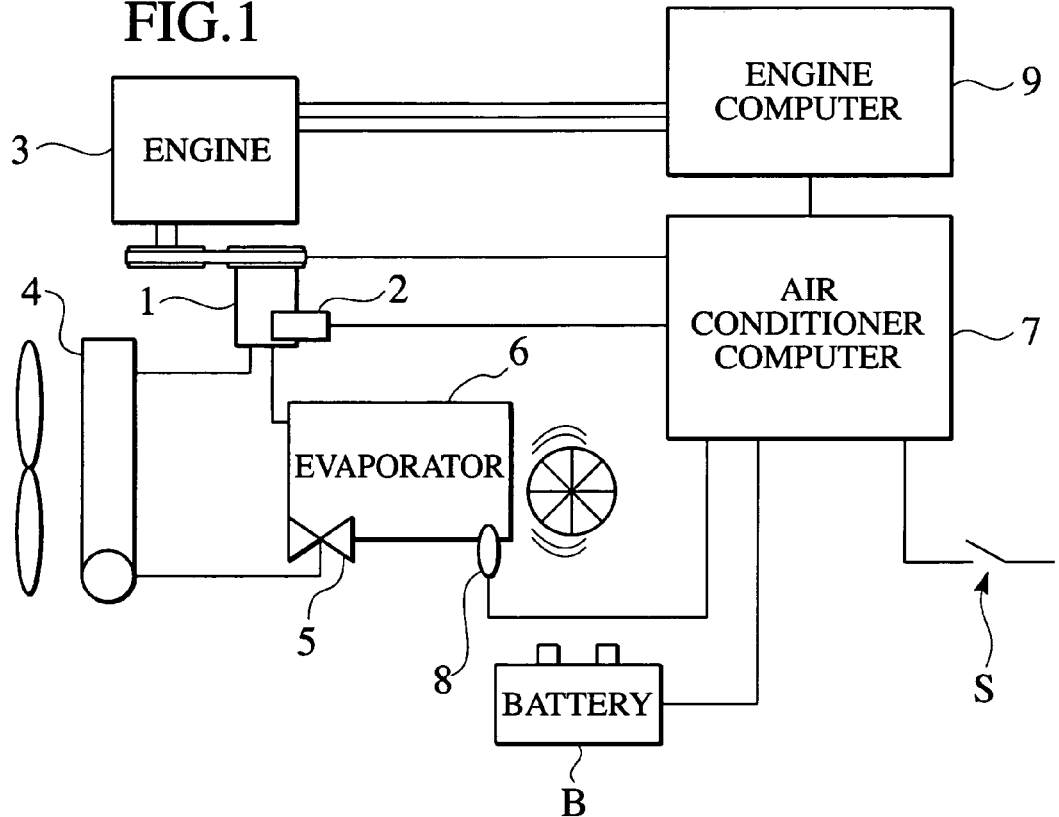
FIG. 1 is a schematic configuration diagram showing an example of an air conditioner for a vehicle as an embodiment of the present invention.
Figure 2:
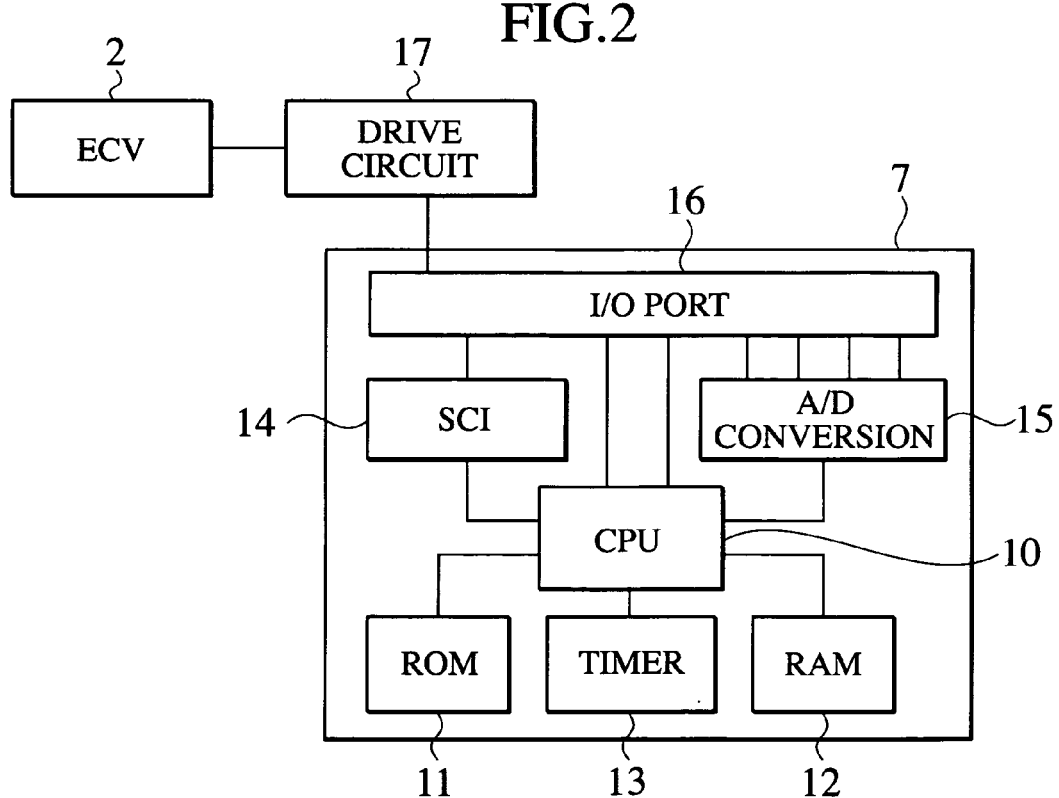
FIG. 2 is a block diagram showing an example of a schematic configuration of an air conditioner computer.

Description is given below of one embodiment of the present invention based on the drawings. FIG. 1 is a schematic configuration diagram of an air conditioner for a vehicle as the one embodiment of the present invention, and FIG. 2 is a block diagram showing a schematic configuration of an air conditioner computer.

In FIG. 1, a variable capacity compressor 1 includes an electronic operation control valve (hereinafter, referred to as an ECV) 2 controlled by an electric signal given from the outside. The variable capacity compressor 1 is driven by an engine 3 as a power source for driving a vehicle. The power source for driving a vehicle may also be a motor. A condenser 4 condenses a high-temperature and high-pressure gas refrigerant compressed by the variable capacity compressor 1. The refrigerant condensed by the condenser 4 turns into a low-temperature and low-pressure liquid refrigerant by being decompressed by an expansion valve 5, is evaporated by an evaporator 6, and cools an air-conditioning wind blown out into a vehicle cabin. The refrigerant evaporated by the evaporator 6 returns to the variable capacity compressor 1, and then, the above-described cycle is repeated.

The variable capacity compressor 1 is one of a swash plate type. The ECV 2 is switched on/off to control a pressure in a crankcase, and a balance of pressures applied to pistons is thus changed, causing a change of an inclination of the swash plate. Accordingly, the variable capacity compressor 1 can control a discharged volume of the refrigerant.

To an air conditioner computer 7 as a controller, there are connected various sensors such as a room air temperature sensor, an outside air temperature sensor, and a solar irradiance sensor, as well as a blown-out air temperature sensor 8 for detecting a temperature of the air blown out from the evaporator 6. The air conditioner computer 7 controls the ECV 2 based on detected values by these sensors. To an engine computer 9, there are connected various sensors such as a vehicle speed sensor, a throttle opening sensor, an engine revolution speed sensor, an intake air pressure sensor, and a coolant temperature sensor. The engine computer 9 controls the engine 3 based on detected values by these sensors.

The air conditioner computer 7 is composed of a microcomputer, and as shown in FIG. 2, includes a CPU 10, a ROM 11, a RAM 12, a timer 13, an SCI (serial interface) 14, an A/D converter 15, an I/O port 16, and the like. The CPU 10 outputs a control signal to a drive circuit 17 of the ECV 2 based on the detected values by the respective sensors and on control information from the engine computer 9, which are given thereto through the I/O port 16.

Figure 3:
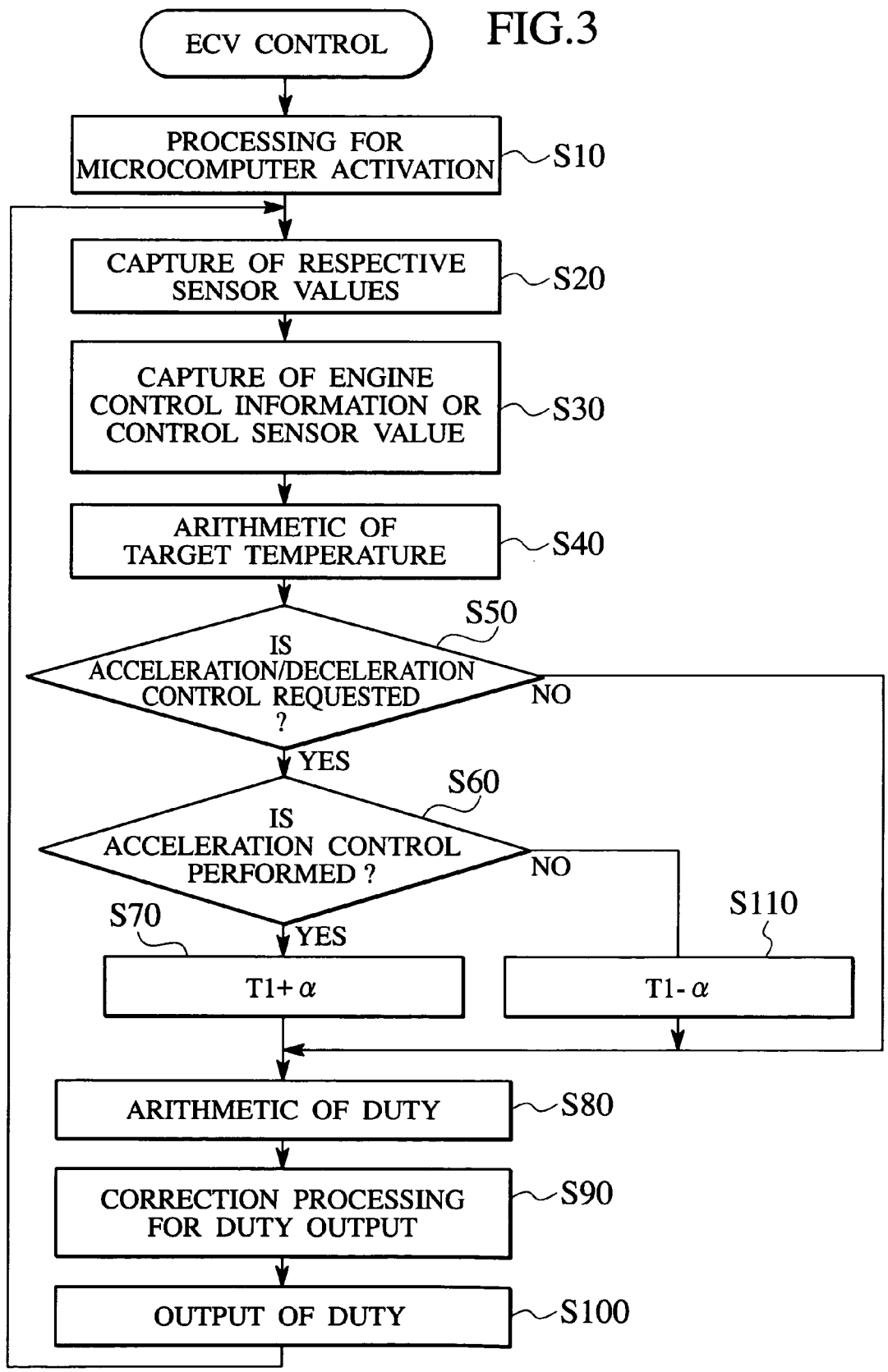
FIG. 3 is a flowchart showing a control procedure of a first embodiment.

Next, an operation of a first embodiment is described based on FIG. 3. In the first embodiment, in either of the time when the vehicle accelerates or climbs a hill, and the time when the engine accelerates, an engine load is increased, thus reducing power consumption of the variable capacity compressor 1. Accordingly, a second target temperature is set higher than a calculated first target temperature. Meanwhile, in either of the time when the vehicle decelerates and the time when the engine decelerates, the engine load is reduced. Accordingly, the second target temperature is set lower than the calculated first target temperature.

When an ignition switch (not shown) of the engine is switched on, and an air conditioner switch S shown in FIG. 1 is switched on, a voltage is supplied from a battery B to the air conditioner computer 7, and an ECV control routine shown in FIG. 3 starts.

First, activation processing for the microcomputer is performed (Step S10), and the detected values by the respective sensors connected to the air conditioner computer 7 are captured into the air conditioner computer 7 (Step S20).

Next, the control information on the engine (flag indicating that the engine is in an acceleration state or a deceleration state, and the like), or the engine control sensor values (throttle opening, vehicle speed, coolant temperature, number of engine revolutions, and the like) are captured into the engine computer 9. When the engine control sensor values are captured, the engine computer 9 performs arithmetic processing for determining whether the engine 3 is in the acceleration state or the deceleration state based on the captured sensor values (Step S30).

Next, the air conditioner computer 7 calculates the first target temperature T1 of the air blown out from the evaporator 6 based on values of the various sensors such as the room air temperature sensor, the outside air temperature sensor, and the solar irradiance sensor, and on a set temperature set by a passenger through an operation panel (not shown) (Step S40).

Next, the air conditioner computer 7 determines whether or not the air conditioner is in a state where a control to change the first target temperature T1 is requested (Step S50). Then, in the case of YES, the engine computer 9 determines whether or not the requested control is an acceleration control (Step S60). Then, in the case of the acceleration control, the air conditioner computer 7 sets $T1+\alpha(\alpha>0)$ as the second target temperature (Step S70).

Next, the air conditioner computer 7 calculates a duty ratio of the ECV 2 based on this second target temperature (Step S80), performs correction processing for replacing a duty ratio outputted to the ECV 2 with this duty ratio (Step S90), and outputs this duty ratio to the ECV 2 (Step S100). Then, the routine returns to Step S20.

Note that, when it has been determined in Step S50 that the air conditioner is not in a state where the control to change the first target temperature is to be performed, the routine proceeds to Step S80, where the duty ratio is calculated based on the first target temperature T1. Moreover, in the case of NO (that is, deceleration control) in Step S60, $T1-\alpha$ is set as the second target temperature (Step S110), and in Step S80, the duty ratio is calculated based on this second target temperature.

As described above, at the time of acceleration, the second target temperature is set higher by the predetermined temperature than the first target temperature T1 calculated based on the set temperature, and the power consumption of the variable capacity compressor 1 is thus reduced. Accordingly, an amount of fuel consumption is reduced, and the engine load is reduced, and therefore, the acceleration is improved.

Note that, in the case of performing the control directly by the duty ratio without raising the first target temperature, it is difficult to calculate an appropriate duty ratio. Accordingly, it is sometimes possible that an actual temperature of the blown-out air from the evaporator 6 overshoots to raise room air temperature, thereby damaging the comfortableness. As opposed to this, in the present invention, the temperature of the blown-out air from the evaporator 6 does not exceed $T1+\alpha$ and accordingly, the comfortableness is not damaged.

Moreover, the target temperature of the blown-out air from the evaporator 6 is directly controlled, thus making it easier to perform the control as compared with the control by the duty ratio. In such a way, an advantage that it becomes unnecessary to create a map (characteristic chart) is obtained. In addition, an advantage is obtained that variations of the actual temperature of the blown-out air from the evaporator 6 can be restricted in the case of rapidly changing a capacity of the variable capacity compressor 1, thus making it possible to obtain appropriate cooling power.

Furthermore, even in the case of receiving a request to reduce the engine load from the engine computer 9, since the duty ratio is not constant, and the capacity is always controlled by the duty ratio obtained by the arithmetic, the appropriate cooling power can be obtained irrespective of the engine load.

Moreover, in the first embodiment, the second target temperature is dropped at the time of deceleration to recover the cooling power lost at the time of acceleration, thus making it possible to ensure the comfortableness more surely. Such a control method can be introduced into a vehicle in which engine fuel injection is not performed during a period until recovery to an idle state at the time of deceleration, thus making it possible to further achieve the fuel consumption improvement. Note that, instead of the time of deceleration, even by dropping the second target temperature at the time of a constant speed of the vehicle or at the time of a constant speed of the power source for driving the vehicle, a substantially similar effect can be obtained since a ratio of power consumption of the air conditioner to the engine load is small.

Figure 4:
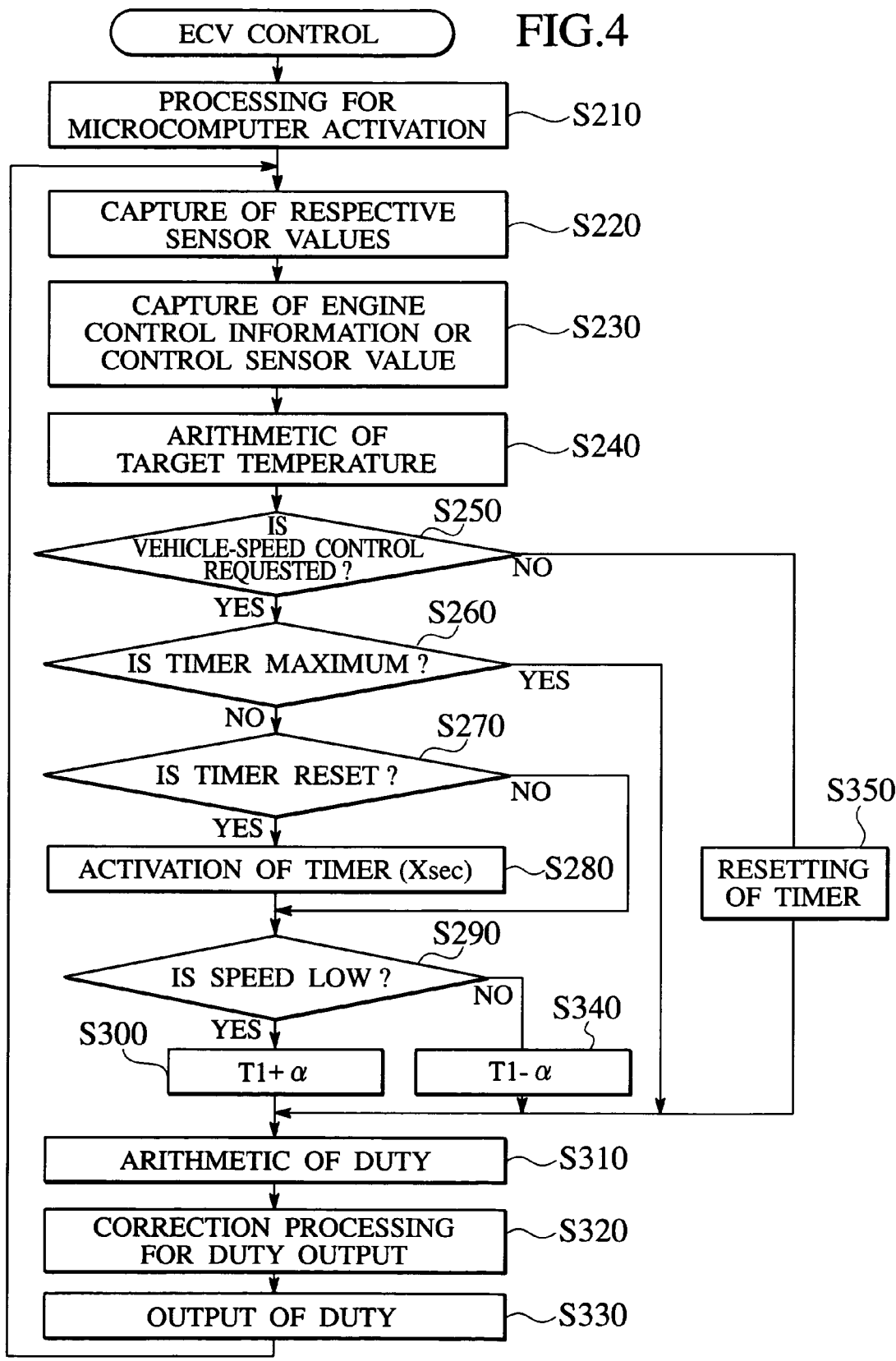
FIG. 4 is a flowchart showing a control procedure of a second embodiment.

Next, an operation of a second embodiment is described based on FIG. 4. In either of the time of a low speed of the vehicle, which includes the stationary time of the vehicle, and the time of a low speed of the power source for driving the vehicle, which includes the idle state, the fuel consumption is significantly lowered owing to the operation of the compressor. Moreover, at a certain speed or more, a rate of lowering of the fuel consumption owing to the operation of the compressor is reduced as compared with that at the time of the low speed.

Accordingly, in the second embodiment, the second target temperature is set as $T1+\alpha$ only during a predetermined time when the vehicle or the power source for driving the vehicle enters into a low-speed state, and the power consumption of the variable capacity compressor 1 is thus reduced. On the other hand, the second target temperature is set as $T1-\alpha$ only during a predetermined time when the vehicle or the power source for driving the vehicle enters into a high-speed state, and the cooling power is thus recovered.

An ECV control routine of the above is described in order. First, the activation processing for the microcomputer is performed (Step S210), and the detected values by the respective sensors connected to the air conditioner computer 7 are captured into the air conditioner computer 7 (Step S220).

Next, the control information on the engine (flag indicating that the engine is in the low-speed state or the high-speed state, and the like), or the engine control sensor values (throttle opening, vehicle speed, number of engine revolutions, and the like) are captured into the engine computer 9. When the engine control sensor values are captured, the engine computer 9 performs arithmetic processing for determining whether the engine 3 is in the low-speed state or the high-speed state based on the captured sensor values (Step S230).

Next, the air conditioner computer 7 calculates the first target temperature T1 of the air blown out from the evaporator 6 based on the values of the various sensors such as the room air temperature sensor, the outside air temperature sensor, and the solar irradiance sensor, and on the set temperature set by the passenger through the operation panel (not shown) (Step S240).

Next, the air conditioner computer 7 determines whether or not the air conditioner is in the state where the control to change the first target temperature is requested (Step S250). Then, in the case of YES, the CPU 10 determines whether or not an elapsed time of the timer 13 has reached the maximum thereof (Step S260). In the case of NO, the CPU 10 determines whether or not the timer 13 is to be reset (Step S270). In the case of YES, the CPU 10 resets and activates the timer 13 (Step S280).

Next, the engine computer 9 determines whether or not the vehicle speed is in a state of low speed equal to or less than a predetermined speed (Step S290). When the vehicle speed is low, the air conditioner computer 7 sets T1+α(α>0) as the second target temperature (Step S300).

Next, the air conditioner computer 7 calculates the duty ratio of the ECV 2 based on this second target temperature (Step S310), performs the correction processing for replacing the duty ratio outputted to the ECV 2 with this duty ratio (Step S320), and outputs this duty ratio to the ECV 2 (Step S330). Then, the routine returns to Step S220.

Step S260 to Step S330 are repeated until the elapsed time of the timer 13 reaches the maximum thereof, and the control to change the first target temperature continues. Then, when the elapsed time of the timer 13 has reached the maximum thereof, the determination is made as YES in Step S260, and the control to change the first target temperature is finished.

Note that, when the vehicle speed is larger than the predetermined speed (high-speed state), the determination is made as NO in Step S290, the air conditioner computer 7 sets T1−α as the second target temperature (Step S340), and in Step S310, the duty ratio is calculated based on this second target temperature.

Moreover, when the air conditioner computer 7 has determined in Step S250 that the air conditioner is not in the state where the control to change the first target temperature is to be performed, the timer 13 is reset (Step S350), and the control to change the first target temperature is not performed.

As described above, in the second embodiment, at the time of low speed, when the lowering rate of the fuel consumption is increased, the second target temperature is set higher by the predetermined temperature than the first target temperature T1 calculated based on the set temperature. In such a way, the power consumption of the variable capacity compressor 1 is reduced, and the fuel consumption is improved. Moreover, the second target temperature of the blown-out air from the evaporator 6 does not exceed T1+α and accordingly, the comfortableness is not damaged.

Moreover, in the second embodiment, the second target temperature is dropped at the time of the high speed, when the lowering rate of the fuel consumption is lowered, and the cooling power lost at the time of the low speed is thus to be recovered, thus making it possible to ensure the comfortableness more surely without lowering the fuel consumption.

Figure 5:
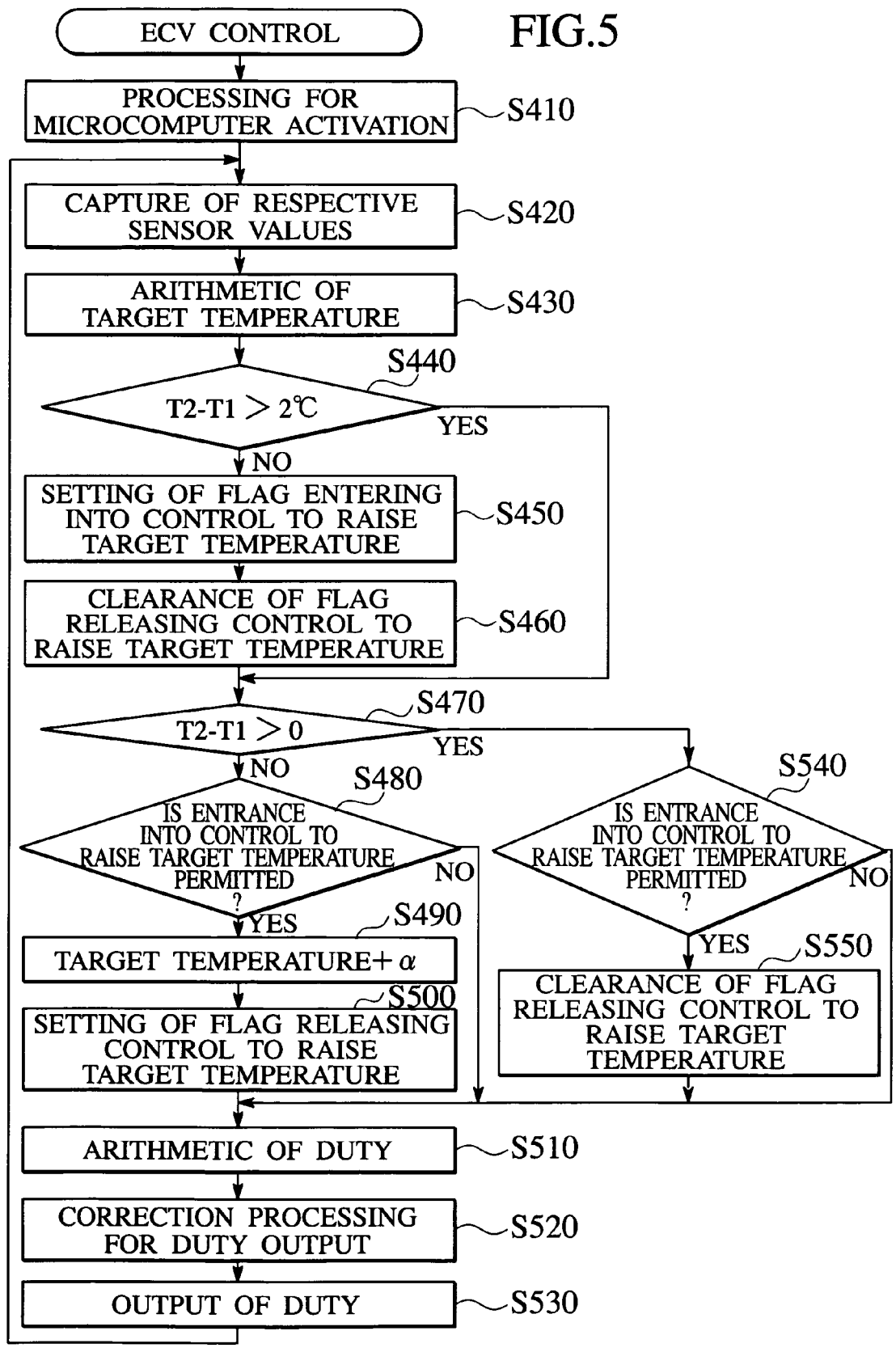
FIG. 5 is a flowchart showing a control procedure of a third embodiment.

Next, an operation of a third embodiment is described based on FIG. 5. When the air conditioner is activated, the actual temperature T2 of the blown-out air from the evaporator 6 is being dropped, and is approaching the first target temperature T1. Then, the actual temperature T2 exceeds the first target temperature T1, overshoots to an overcool side, and thereafter, converges on T1. Owing to this overshoot, the variable capacity compressor 1 consumes extra power.

Accordingly, in the third embodiment, the second target temperature is set as T1+α when the actual temperature T2 becomes equal to the first target temperature T1, and an amount of the overshoot is thus reduced to make extra power consumption of the variable capacity compressor 1 reduced.

An ECV control routine of the above is described in order. First, the activation processing for the microcomputer is performed (Step S410), and the detected values by the respective sensors connected to the air conditioner computer 7 are captured into the air conditioner computer 7 (Step S420).

Next, the air conditioner computer 7 calculates the first target temperature T1 of the air blown out from the evaporator 6 based on the values of the various sensors such as the room air temperature sensor, the outside air temperature sensor, and the solar irradiance sensor, and on the set temperature set by the passenger through the operation panel (not shown) (Step S430).

Next, it is determined whether or not a difference between the actual temperature T2 and first target temperature T1 of the blown-out air from the evaporator 6 is larger than 2° C. (Step S440). In the case of NO, the CPU 10 sets a flag entering into a control to raise the first target temperature (Step S450), and clears a flag releasing the control to raise the first target temperature (Step S460). Note that, in the case of YES in Step S440, the processing of Steps S450 and S460 is not performed. Here, though the difference between the actual temperature T2 and the first target temperature T1 is 2° C., a temperature restricting the overcooled overshoot as much as possible and not causing a temperature rise to give the passenger a sense of discomfort is set arbitrarily.

Next, the air conditioner computer 7 determines whether or not the actual temperature T2 is higher than the first target temperature T1 (Step S470). In the case of NO, it is determined whether or not the air conditioner is in a state capable of entering into the control to raise the first target temperature (Step S480). Specifically, the air conditioner computer 7 determines whether or not the flag entering into the control is set and the flag releasing the control is cleared, and whether or not other conditions are satisfied. In the case of YES, the air conditioner computer 7 sets T1+α(α>0) as the second target temperature (Step S490), and sets the flag releasing the control to raise the first target temperature (Step S500).

Next, the air conditioner computer 7 calculates the duty ratio of the ECV 2 based on this second target temperature (Step S510), performs the correction processing for replacing the duty ratio outputted to the ECV 2 with this duty ratio (Step S520), and outputs this duty ratio to the ECV 2 (Step S530). Then, the routine returns to Step S420.

Note that, when it has been determined in Step S480 that the air conditioner is not in the state capable of entering into the control to raise the first target temperature, the routine proceeds to Step S510, where the air conditioner computer 7 calculates the duty ratio based on the first target temperature T1.

Moreover, in the case of YES in Step S470, the air conditioner computer 7 determines whether or not the flag releasing the state entering into the control to raise the first target temperature is set (Step S540). In the case of YES, the flag entering into the control to raise the first target temperature is cleared (Step S550), and the routine proceeds to Step S510. In the case of NO in Step S540, the routine proceeds to Step S510 without passing through Step S550.

Figure 6:
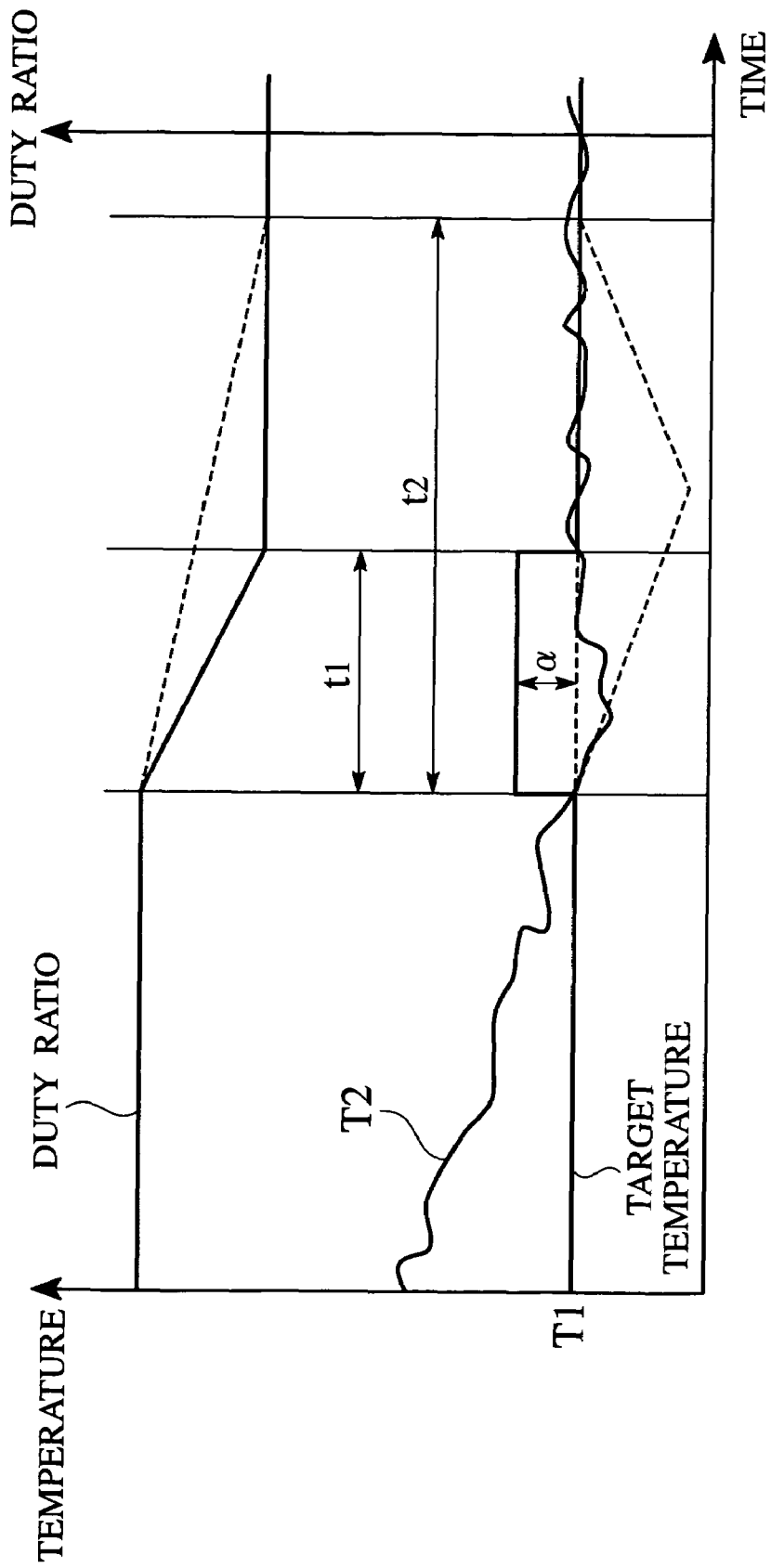
FIG. 6 is a graph showing an effect of the third embodiment.

FIG. 6 is a graph showing changes of the actual temperature T2, the first target temperature T1, and the duty ratio, in which an axis of abscissas represents the time, and an axis of ordinates represents the temperature and the duty ratio. The actual temperature T2, the first target temperature T1, and the duty ratio in the third embodiment are shown by solid lines, and the actual temperature T2, the first target temperature T1, and the duty ratio in the conventional technology are shown by broken lines. It is seen that, while the first target temperature is constant in the conventional technology, in the third embodiment, the second target temperature becomes T1+α immediately before the actual temperature T2 becomes equal to the first target temperature T1, and a time t1 during which the overshoot occurs gets shorter than a conventional overshoot time t2. In such a way, the duty ratio of the third embodiment differs from the conventional case during the time t2, and the extra power consumption of the variable capacity compressor 1 is reduced.

Note that the second target temperature of the blown-out air from the evaporator 6 does not exceed T1+α and accordingly, the comfortableness is not damaged.

Figure 7:
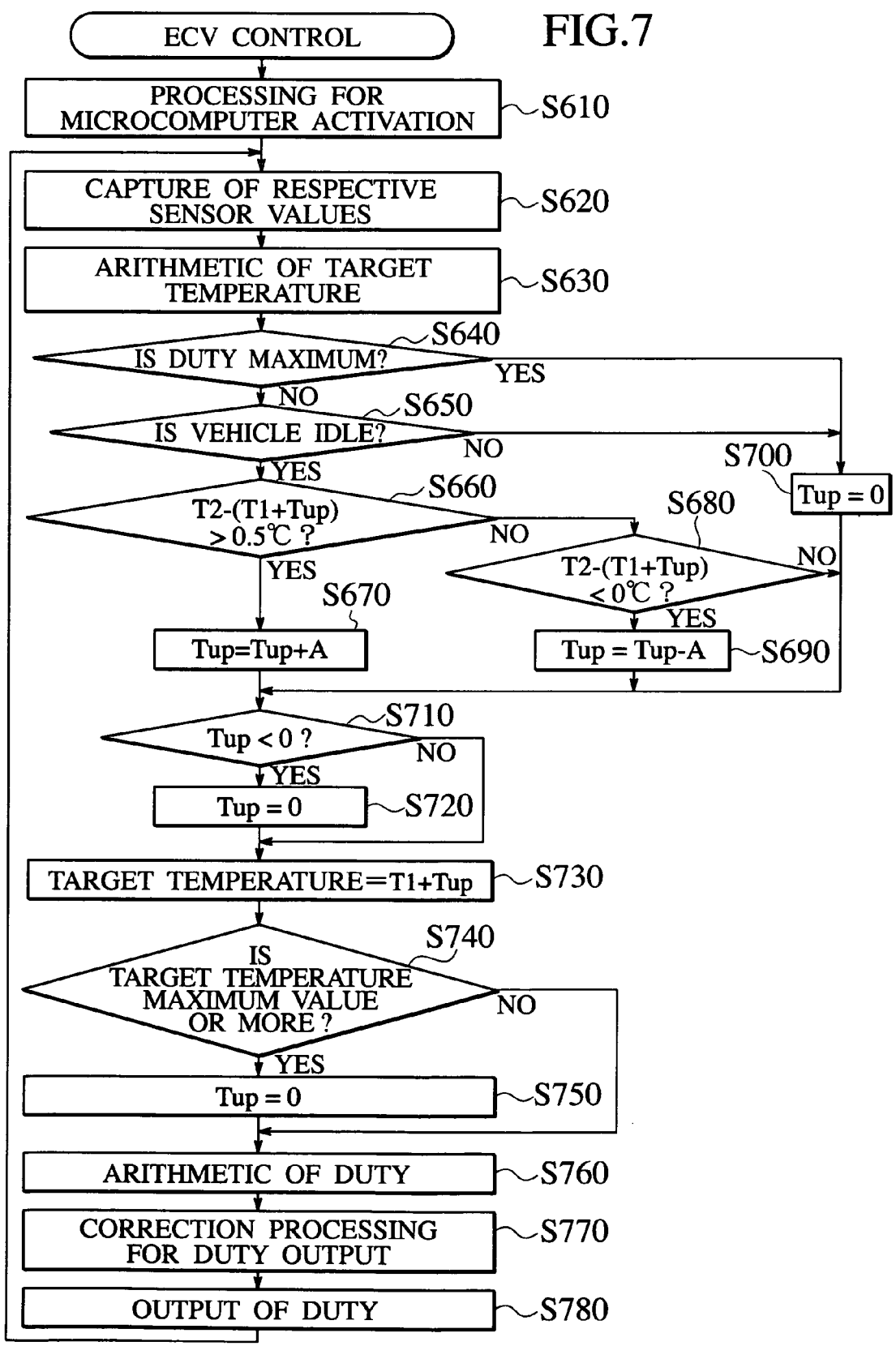
FIG. 7 is a flowchart showing a control procedure of a fourth embodiment.

Next, an operation of a fourth embodiment is described based on FIG. 7. In a state where the vehicle turns from a running state to the idle state (from a time t3 to a time t4), and where the variable capacity compressor 1 shifts from a controlled range to a range of exerting the maximum performance (from the time t3 to the time 4), in the conventional technology, even if the vehicle enters again into the running state (after the time t4), the duty ratio is maintained constant as shown in a period from the time t4 to a time t5, and thereafter, the duty ratio starts to be lowered. Then, at a time t7, the duty ratio reaches a value corresponding to the first target temperature T1. As a result, since the duty ratio does not reach the value corresponding to the first target temperature rapidly, the actual temperature overshoots, and the variable capacity compressor 1 will consume extra power. Here, "exerting the maximum performance" refers to "the discharged volume of the refrigerant becomes the maximum." Specifically, the duty ratio becomes the maximum.

Accordingly, in the fourth embodiment, when the vehicle turns into the idle state, the first target temperature is raised step by step, and a time by which the duty ratio approaches the maximum value is delayed. In such a way, when the vehicle turns again into the running state, the variable capacity compressor 1 is made to enter into the controlled range rapidly, and the extra power consumption of the variable capacity compressor 1 is reduced.

An ECV control routine of the above is described in order. Note that a temperature A is a temperature added to the first target temperature T1 in one routine, and a temperature Tup is a total value of the temperature added to T1. Specifically, the temperature Tup in two routines is 2A.

When the control routine starts, first, the activation processing for the microcomputer is performed (Step S610), and the detected values by the respective sensors connected to the air conditioner computer 7 are captured into the air conditioner computer 7 (Step S620).

Next, the air conditioner computer 7 calculates the first target temperature T1 of the air blown out from the evaporator 6 based on the values of the various sensors such as the room air temperature sensor, the outside air temperature sensor, and the solar irradiance sensor, and on the set temperature set by the passenger through the operation panel (not shown) (Step S630).

Next, the air conditioner computer 7 determines whether or not the duty ratio is the maximum value (Step S640). In the case of NO, it is determined whether or not the vehicle is in the idle state (Step S650). In the case of YES, it is determined whether or not T2−(T1+Tup) is larger than 0.5° C. (Step S660). Note that, since Tup is equal to 0 in an initial state, it will be determined whether or not T2−T1 is larger than 0.5° C. Although a reference temperature is set at 0.5° C. here, the reference temperature just needs to be the minimum value capable of determining the case where the compressor capacity is in a full stroke state, and where the actual temperature does not reach the first target temperature T1.

In the case of YES in Step S660, the air conditioner computer 7 sets, as the temperature Tup, a value obtained by adding the temperature A to Tup (Step S670). Note that, since Tup is equal to 0 in the initial state, Tup becomes equal to A after the addition. In the case of NO in Step S660, the air conditioner computer 7 determines whether or not T2−(T1+Tup) is smaller than 0° C. (Step S680). In the case of YES, a value obtained by subtracting the temperature A from Tup is set as Tup (Step S690). Moreover, in the case of YES in Step S640, and in the case of NO in Step S650, the temperature Tup is set at 0, and the routine proceeds to Step S710.

Next, the air conditioner computer 7 determines whether or not Tup is smaller than 0 (Step S710). In the case of YES, Tup is set at 0 (Step S720). In the case of NO, T1+Tup is set as the second target temperature without changing the temperature Tup (Step S730).

Next, the air conditioner computer 7 determines whether or not the second target temperature is equal to or more than the maximum temperature T3 capable of ensuring the lowest dehumidification level (Step S740). In the case of YES, Tup is set at 0 (Step S750). In the case of NO, the duty ratio of the ECV 2 is calculated based on the second target temperature without changing Tup (Step S760).

Then, the air conditioner computer 7 performs the correction processing for replacing the duty ratio outputted to the ECV 2 with this duty ratio (Step S770), and outputs this duty ratio to the ECV 2 (Step S780), and the routine returns to Step S620.

Figure 8:
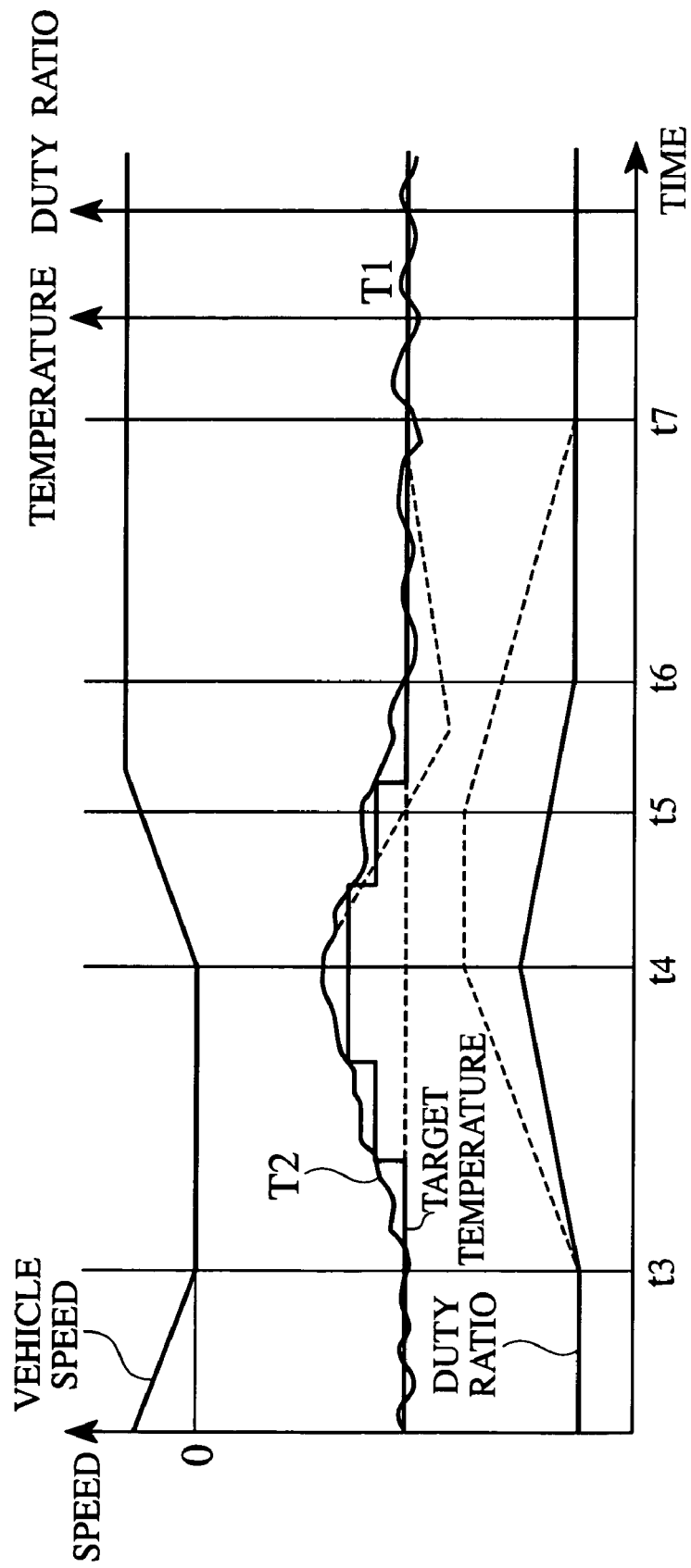
FIG. 8 is a graph showing an effect of the fourth embodiment.

FIG. 8 is a graph showing changes of the vehicle speed, the actual temperature T2, the first target temperature T1, and the duty ratio, in which an axis of abscissas represents the time, and an axis of ordinates represents the speed, the temperature and the duty ratio. The actual temperature T2, the first target temperature T1, and the duty ratio in the fourth embodiment are shown by solid lines, and the actual temperature T2, the first target temperature T1, and the duty ratio in the conventional technology are shown by broken lines. It is seen that, while the first target temperature is constant in the conventional technology, in the fourth embodiment, the first target temperature T1 is increased step by step after the vehicle enters into the idle state (vehicle speed=0) at the time t3.

It is seen that, in such a way, the time by which the duty ratio approaches the maximum value is more delayed than in the conventional case, and the variable capacity compressor 1 enters into the controlled range rapidly when the vehicle enters again into the running state. Hence, the extra power consumption of the variable capacity compressor 1 is reduced.

As described above, when a delay effect is generated in the full stroke state of the variable capacity compressor 1, a rebound into the capacity control of the variable capacity compressor 1 hardly occurs.

Note that, since the second target temperature of the blown-out air from the evaporator 6 does not exceed the maximum temperature T3, the comfortableness is not damaged.

Note that the present invention can be applied to an air conditioner in which the variable capacity compressor 1 is driven by a power source for driving a vehicle, which is other than the engine 3.

INDUSTRIAL APPLICABILITY

The air conditioner for a vehicle according to the present invention includes: the variable capacity compressor for compressing the refrigerant by the power source for driving the vehicle, which is provided in the vehicle, and for controlling the discharged volume of the refrigerant; and the controller for setting the second target temperature higher by the predetermined temperature than the preset first target temperature when entering into the state where the fuel consumption of the power source for driving the vehicle is lowered, and for controlling the discharged volume of the refrigerant based on the second target temperature. Hence, the air conditioner for a vehicle according to the present invention is utilized not only for the air conditioner mounted on the vehicle but also for an air conditioner provided with a power source for driving the conditioner.

The invention claimed is:

1. An air conditioner for a vehicle, comprising:
a variable capacity compressor for compressing a refrigerant and controlling a discharged volume of the refrigerant by a power source for driving a vehicle; and
a controller for setting a target temperature and controlling the discharged volume of the refrigerant based on the target temperature according to a state of the power source for driving the vehicle,
wherein the controller is adapted for setting a second target temperature higher than a preset first target temperature by a predetermined temperature when the power source enters into a low-speed state and for setting the second target temperature lower than the preset first target temperature by the predetermined temperature when the power source enters into a high-speed state, and
wherein the controller is adapted for controlling the discharged volume of the refrigerant based on the second target temperature.

2. An air conditioner as claimed in claim 1, wherein the controller is adapted for setting the second target temperature higher than the preset first target temperature by the predetermined temperature when an actual temperature becomes substantially equal to the first target temperature, and
wherein the controller is adapted for controlling the discharged volume of the refrigerant based on the second target temperature.

3. An air conditioner as claimed in claim 1, wherein the controller is adapted for rising the target temperature step by step by another predetermined temperature when the power source turns into an idle state.

* * * * *